US005090970A

United States Patent [19]
Rue et al.

[11] Patent Number: 5,090,970
[45] Date of Patent: Feb. 25, 1992

[54] BONDED ABRASIVE TOOLS WITH COMBINATION OF FINELY MICROCRYSTALLINE ALUMINOUS ABRASIVE AND A SUPERBRASIVE

[75] Inventors: Charles V. Rue, Petersham; Leonard G. Pukaite, West Boylston; Krishnamoorthy Subramanian, Groton, all of Mass.

[73] Assignee: Norton Company, Worcester, Mass.

[21] Appl. No.: 532,412

[22] Filed: Jun. 4, 1990

Related U.S. Application Data

[63] Continuation-in-part of Ser. No. 243,284, Sep. 9, 1988, Pat. No. 4,944,773, which is a continuation-in-part of Ser. No. 95,781, Sep. 14, 1987, abandoned.

[51] Int. Cl.$^5$ .............................................. C09C 1/68
[52] U.S. Cl. ................................. 51/309; 51/295; 51/298
[58] Field of Search ........................ 51/295, 298, 309

[56] References Cited

U.S. PATENT DOCUMENTS

| | | | |
|---|---|---|---|
| 2,979,414 | 4/1961 | Ryshkewitch et al. | 51/309 |
| 3,437,468 | 4/1969 | Seufert | 51/309 |
| 3,940,276 | 2/1976 | Wilson | 51/309 |
| 3,944,398 | 3/1976 | Bell | 51/307 |
| 4,314,827 | 2/1982 | Leitheiser et al. | 51/309 |
| 4,543,107 | 9/1985 | Rue | 51/308 |
| 4,623,364 | 11/1986 | Cottringer et al. | 51/309 |
| 4,741,743 | 5/1988 | Narayanan et al. | 51/309 |
| 4,883,501 | 11/1989 | Haynes, Jr. | 51/309 |
| 4,944,773 | 7/1990 | Rue et al. | 51/307 |

*Primary Examiner*—William R. Dixon, Jr.
*Assistant Examiner*—Willie J. Thompson
*Attorney, Agent, or Firm*—David Bennett

[57] ABSTRACT

Abrasive articles are disclosed comprising at least about 10% by volume of a superabrasive, such as CBN, along with a sintered sol gel aluminous abrasive component.

18 Claims, No Drawings

BONDED ABRASIVE TOOLS WITH COMBINATION OF FINELY MICROCRYSTALLINE ALUMINOUS ABRASIVE AND A SUPERBRASIVE

CROSS REFERENCE TO RELATED APPLICATION

This application is a continuation-in-part of application Ser. No. 07/243,284 filed Sept. 9, 1988 which is a continuation-in-part of application Ser. No. 95,781 filed Sept. 14, 1987 (now abandoned).

TECHNICAL FIELD

This invention relates to bonded abrasive tools, particularly grinding wheels, comprising generally discrete, size graded abrasive grits mixed with a distinct continuous bonding material such as a glass, a cured resin, or a metal. Some of the abrasive grits are superabrasives such as diamond or cubic boron nitride ("CBN"). The CBN may be either monocrystalline or polycrystalline. CBN is both significantly harder and significantly more expensive than such conventional abrasives as alumina, zirconia-alumina, and silicon carbide.

TECHNICAL BACKGROUND

Superabrasives, such as CBN, generally cost about one hundred to one thousand times as much per unit volume as other conventional abrasives but nevertheless are cost effective in grinding certain materials such as tool steels.

CBN is used predominantly in grit sizes from about 100-400 for precision grinding processes. In general in the prior art the total grinding performance of a tool containing CBN has been found to correlate closely with the volume fraction of CBN in the tool, although a certain amount of porosity in a grinding wheel containing CBN is usually desirable. Conventional abrasives have been used together with other superabrasives in abrasive tools in the prior art, but the conventional abrasive in such products has functioned primarily as a kind of filler and has contributed little if anything as an abrasive to the total cutting tool life when the tool was used on hard work pieces such as tool steels. For example, "A" Makhlouf et al. U.S. Pat. No. 4,652,277 of Mar. 24, 1987 refers to the use of silicon carbide and alumina to help make the coefficients of thermal expansion of the rim and core regions as close to each other as possible in a grinding wheel containing CBN in the rim region only, but there is no suggestion that these conventional abrasive materials contribute directly as abrasives to the cutting performance of the wheel.

SUMMARY OF THE INVENTION

It has been found tat the grinding effectiveness of bonded abrasive tools containing a given volume fraction of a superabrasive can be substantially enhanced in many applications by using a particular type of sintered aluminous abrasive grits along with the superabrasive.

The superabrasive used in the invention is selected from diamond and cubic boron nitride, known generally and hereafter in this specification as CBN. CBN is in fact the preferred superabrasive in the present invention.

The amount of superabrasive used in the articles of the present invention represents from at least about 10% to about 55% and more preferably from 20 to 50% of the volume of the article.

In addition the superabrasive provides from about 25 to about 90% of the volume of the abrasive grits in the article and preferably from about 40 to about 80% of the abrasive volume.

Aluminous abrasive grits suitable for this invention are denoted herein as "microcrystalline alumina" or "MCA". These abrasives are made by sol gel processes such as those described in U.S. Pat. No(s). 4,623,364 and 4,314,827. The preferred process is that of the former patent wherein very fine "seeds" are added to the sol, the amount of seed material not exceeding 5% by weight, and preferably not more than 2% by weight of the total alumina in the final product. The seeding results in a much finer crystal structure than the process of U.S. Pat. No. 4,314,827 which does not employ seeds and the seeded product produces abrasive grits which are higher in density and harder.

The MCA may be present in the wheel formulation up to an amount that is less than about 40% by volume of the wheel to as little as about 10% by volume of the wheel composition. Obviously the greater the amount of MCA present, the greater the cost savings since MCA is significantly less expensive than superabrasive materials.

Microcrystalline alumina for use in this invention is preferably characterized by a microstructure, as revealed by examination of 5,000-20,000 X by light or electron microscopy, that predominantly comprises tightly packed, very fine crystals of alpha alumina or of an aluminum spinel such as magnesium aluminate. The predominant crystallites have maximum dimensions of no more than about 1 micron, preferably no more than about 0.7 microns, and still more preferably no more than about 0.3 micron. The predominant crystallites generally show little or no regular faceting at about 5,000 magnification and are approximately equiaxed, with no higher aspect ratio than 2, usually less than 1.5.

In addition to the predominant types of fine crystallites as described above, MCA for use in this invention can contain up to about forty percent of its volume of other materials, such as coarse alumina lath shaped crystals believed to be formed by growth of some of the predominant finer crystallites, or a spinel matrix with poorly defined grain boundaries.

The MCA abrasive grits for use in this invention preferably have a density of at least 90%, more preferably at least 95% of the theoretical density corresponding to their chemical analysis and preferably have a hardness of at least 16, more preferably of at least 18, still more preferably at least 19 gigapascals.

DESCRIPTION OF THE PREFERRED EMBODIMENTS

MCA for use in this invention may be made by a variety of processes, preferably those processes described and claimed in U.S. Pat. No(s). 4,623,364; 4,314,827; and 4,744,802 which are hereby incorporated by reference. The grits made according to the first and third patents are made by mixing minor proportions, usually less than 5% by volume, of very fine crystalline seed particles with sols or gels containing hydrated forms of alumina, such as boehmite, and optionally also containing materials such as magnesia that can form spinels with part of the alumina content, then drying the seeded sol or gel and heating the dried seeded gel to an appropriate temperature for an appropriate time to generate the desired microstructure. The microstructure of the abrasive grits is preferably non-cellular. Sizing to abrasive grits can be accomplished before or after final heating, with the former preferred because it is easier.

Any effective seed material may be used as an alternative to the alpha alumina seeds taught explicitly by U.S. Pat. No. 4,623,364. In general suitable seed materials are isostructural with the alpha-alumina product desired, with the lattice parameters as close as possible to those of alpha alumina. These include materials such as ferric oxide for example. Any form of hydrated alumina sol or gel may be seeded, although the sols and seeds taught by Cottringer are generally preferred. Preferably, when the preferred materials taught by Cottringer are used, the seeds are as fine as practically obtainable, and the total amount of seeds does not exceed 5%, or more preferably does not exceed 2%, by weight of the total alumina in the final product.

The finely microcrystalline aluminous grits and the CBN grits used together to this invention generally are mixed together with conventional bond ingredients, optionally including porosity formers, pressed into appropriate shapes, and heated to form grinding tools of approximately uniform composition throughout, all according to methods and practices conventional in the bonded abrasives arts. Bonds of any of the general types common in the art, such as glass or vitrified, resinoid, or metal (including electroplated), may be used effectively, as well as hybrid bonds such as metal filled resinoid bonds and resin impregnated vitrified bonds. All the known fillers, active and non-active, e.g. teflon, graphite, and silver as well as potassium sulfate, cryolite and kyanite can be used in the abrasive articles of the invention. Alternatively, the mixed grits characteristic of this invention can be concentrated in the outer parts of a grinding tool, for example by entrapping the grits in metal accreted on a supporting surface by electroplating or by placing the mixed grits around the periphery of a brazing type metal alloy and then partially softening or melting the alloy in a vacuum furnace so that the grits sink into the alloy sufficiently to hold them in place when the tool is later cooled. This again is a conventional manufacturing technique adapted to the uses of this invention, and generally any conventional type or shape of bonded abrasive tool known in the prior art and utilizing a substantial amount of CBN grits can be made advantageously in an otherwise conventional manner by replacing part of the CBN grits with finely microcrystalline aluminous grits according to this invention.

The practice and value of the invention may be further appreciated from the following non-limiting examples.

EXAMPLE 1 AND COMPARATIVE EXAMPLE C1

These examples described grinding wheels made with a vitrified bond and containing seeded sol gel alumina and CBN abrasive grits. These are compared with wheels containing only CBN abrasive grits.

Two sets of wheels were made up, each with 48% by volume of abrasive grits. In one set the whole volume was provided by CBN grits and these were labelled "C-1". In the other set, (Example 1), a 150 grit, seeded sol gel, alpha alumina was used to provide 10.5% of the volume of the wheel, leaving 37.5 vol % of CBN.

Each wheel was made up with a vitreous bond available from Norton Co., Worcester, Mass., with the designation "HA-6". The proportion of bond was 27 vol % and the pore space was 25 vol %.

The dimensions of all the wheels were $5'' \times \frac{1}{8}'' \times \frac{1}{4}''$. The wheels were each prepared and trued in the same manner then used to grind an M7 steel workpiece with an Rc hardness of 63, using as coolant White & Bagley #1572 oil. After trueing, one 0.020 inch on diameter grind was made and the wheel wear and finish were measured. Then with no further trueing, three further 0.020 inch on diameter grinds were made and the wear and finish were measured after each. The results are set forth in Table 1. Each data point given is the average of four separate runs.

TABLE 1

Comparison of Ex. 1 and C 1

| Wheel | Normal Force lb/in | MRR in3/min.in. | WWR in3/min.in. | G Ratio | Power HP/in | Surface Finish |
|---|---|---|---|---|---|---|
| 1 | 124 | 0.407 | 0.000264 | 1538.4 | 6.8 | 19.7 |
|   | 176 | 0.545 | 0.000337 | 1616.7 | 9.8 | 14.8 |
|   | 226 | 0.974 | 0.000841 | 1158 | 14.7 | 18.8 |
| C 1 | 125 | 0.317 | 0.000098 | 3246 | 6.5 | 15.6 |
|   | 181 | 0.488 | 0.000319 | 1528 | 10.7 | 15.9 |
|   | 222 | 0.936 | 0.001094 | 855.2 | 15.1 | 21.3 |

"Normal Force" is the force exerted normal to the wheel surface during grinding.
MRR is the metal removal rate.
WRR is the wheel wear rate.
G Ratio is MRR/WWR.

From the above data it can be seen that, while the mixture of sol gel alumina and CBN uses about the same, or less, power and force, after an initial period, it achieves significantly better G Ratios and in general, better finishes.

Thus, surprisingly, the blend of minor amounts of a sintered sol gel aluminous abrasive with CBN significantly improves the performance of a vitreous bonded wheel over one containing an equal amount of the premium CBN grit alone.

EXAMPLES 2-3 AND COMPARATIVE EXAMPLES C2-C4

These examples illustrate the application of the invention to grinding tools in which the grits are concentrated on the outside in essentially a single layer. In these particular cases, the bond was a brazing alloy and was applied as follows:

1) Clean and sandblast preform, which is typically steel.
2) Apply layer of brazing paste onto preform. Braze layer thickness varies as a function of grit size, concentration, and grit exposure.
3) Sprinkle abrasive particles onto brazing paste.
4) Place part into vacuum furnace, $1 \times 10^{-4}$ torr minimum.
5) Heat part to brazing temperature, corresponding to the brazing paste applied.
6) Cool part down in vacuum.

Part is complete except for cosmetic operations.

The brazing paste was a commercially available AWS BVAg-8b alloy modified to bond difficult to wet materials, such as, ceramic, diamond, CBN, etc.

All the types of grinding tools for these examples had the same volume percent total abrasive grits in the effective outer layers. The grits were all CBN for type C2, half CBN-half 38A for type C3, half CBN-half MCA for type 2, and three-quarters CBN-one-quarter MCA for type 3. The concentration of abrasive used in the MCA/CBN tests is expressed as 100%. This means the highest density achievable by the sprinkling method. Physically this correlates to about 75% of the abrasive sections' surface area being covered with abrasive, or in the case of 80 grit, approximately 1.4 ct/in. sq.

In the products of these examples, the grits protrude from the surface of the finished tool considerably more than in the grinding wheels described in all the proceeding example. This causes products of this type to have rapid initial cut and correspondingly rapid initial tool wear, and makes it very difficult to determine grinding tool volume losses accurately. The method of measuring performance was therefore changed for these examples: the volume of metal cut was measured along with the reduction in the tool diameter. Results are shown in Table 2.

TABLE 2

Comparison of Grinding Tool Wear and Volume of Metal Removed, Examples 2-3 and C 2-C 3

| Relative Cumulative Metal Volume Cut | Cumulative Tool Diameter Loss, Mm, for: | | | |
|---|---|---|---|---|
| | 2 | 3 | C 2 | C 3 |
| 3 | 0.101 | 0.101 | 0.096 | 0.123 |
| 4 | 0.104 | 0.140 | 0.103 | 0.182 |
| 6 | 0.121 | 0.173 | 0.121 | 0.177 |
| 9 | 0.127 | 0.203 | 0.127 | 0.208 |

Table 2 shows that Types 2 and C2 are almost exactly comparable, while the others are inferior. Because Type 2 has only half as much CBN as Type C2, Type 2 is clearly more economical.

EXAMPLE 4 AND COMPARATIVE EXAMPLE C4

These examples illustrate the invention in grinding tools with resinoid bonds and testing in dry grinding. Comparative Example C 4 had 25 volume % of nickel coated CBN grits (designated below as "CB", for "coated borazon"), while Example 4 had the same amount of CBN but also 4.75 volume % of grit 100 MCA. The green state bond for both wheels consisted of:

| CBN + abrasive coating + sodium hexafluorosilicate | 47.0 vol % |
|---|---|
| Long flow phenolic resin + lime | 36.7 vol % |
| Liquid furfural | 2.3 vol % |
| Flake silver | 14.0 vol % |

The abrasive grits and the bond were mixed in a conventional manner for the manufacture of bonded abrasives, then loaded into steel molds and molded at about 160° C. at a pressure of about 40 megapascals for about 30 minutes to produce a final grinding wheel.

The wheels were tested at 3600 SFPM in grinding a work piece of A.I.S.I. type M-2 steel, hardened to Rockwell C 65, at five different fixed infeed dimensions as shown in Table 3.

TABLE 3

| Relative G Ratios and Power Draws for Types 4 and C 4 | | | | |
|---|---|---|---|---|
| Infeed Depth, mm: | 0.025 | 0.076 | 0.127 | 0.178 |
| G Ratio of Type 4/ G Ratio of Type C 4: | 1.39 | 1.37 | 1.44 | 1.47 |
| Power Draw of Type 4/ Power Draw of Type C 4: | 1.21 | 1.20 | 1.11 | 1.05 |

Inasmuch as the ratio of G Ratios for the two types of wheels is always higher than the ratios of power draw rated, the wheel according to this invention has an operating advantage that increases with increasing infeed depth. Though the power draw is also increased for the wheels according to the invention, the increase in G Ratio is far greater, and therefore the advantage obtained far outweighs the relatively minor concomitant disadvantage.

EXAMPLE 5 AND COMPARATIVE EXAMPLE C4

These examples illustrate the use of the invention in metal bonded wheels without exceptionally protruding abrasive grits in the outer section. Example 5 used both CBN and MCA abrasive grits in a volume ratio of 3:1, while Comparative Example C 4 had the same total volume of all CBN grits. The bond composition was 81.4% copper and tin powders with a wetting agent, then adding the abrasive grits and mixing again, pressing cold around a core at a pressure of about 330 megapascals to form a green wheel, and sintering the green wheel in a mixed nitrogen and hydrogen atmosphere to a final temperature of about 550° C. over a period of five hours to reach final temperature and three hours at final temperature. All the wheel making procedures, except for the use of mixed types of abrasive grits, were conventional in the art. In an average of two tests under the same conditions with each type of wheel, Type 5 had a G-Ratio 17% higher than Type C 4, while drawing about 10% less power. Type 5 is therefore preferable.

EXAMPLE 6 AND COMPARATIVE EXAMPLE C4

These examples illustrate the use of the invention in a resinoid bonded wheel for grinding steel while cooling with oil. Example 6 was like Example 4, except that the total amount of abrasive grit was 25 volume %, of which one quarter was MCA grits and the balance CB. Wheels of Type 6 were compared against wheels of Type C4 in grinding A.I.S.I. Type M-2 steel, hardened to Rockwell C 65 hardness while cooling with oil at a low infeed rate. Type 6 had a G Ratio 45% higher than Type C4, while drawing slightly less power.

EXAMPLES 7 and 8

These examples are closely related to Example 5. The materials used are the same as in that Example, except that the MCA abrasive used was coated with nickel, by conventional electroless nickel plating, to give a thickness of coating corresponding to 54% of the weight of the coated abrasive grit. Except for this change, Example 7 was like Example 5, while Example 8 was like Example 7, except that the amounts of abrasive grit used provided 6.25 volume % MCA and 18.75 volume % CB. The relative performance of wheels of these types in dry grinding of the same steel as shown under Example 5 is shown in Table 4.

TABLE 4

| Relative G Ratios and Power Draws for Types 7, 8, and C 4 | | | |
|---|---|---|---|
| Infeed Depth, mm: | 0.076 | 0.127 | 0.178 |
| G Ratio of Type 7/ G Ratio of Type C 4: | 1.30 | 1.60 | 2.58 |
| G Ratio of Type 8/ G Ratio of Type C 4: | 1.30 | 1.79 | 2.23 |
| Power Draw of Type 7/ Power Draw of Type C 4: | 1.24 | 1.22 | 1.16 |
| Power Draw of Type 8/ | 1.12 | 1.04 | 0.99 |

TABLE 4-continued

Relative G Ratios and Power Draws for Types 7, 8, and C 4

Power Draw of Type C 4:

Comparison of the data in Table 4 with that in Table 3 shows that the advantage of this invention in this bond material is even more marked when the MCA grits are nickel coated. Wheels of types 7 and 8 were also tested in the same type of grinding test, except for the use of water soluble oil to cool the work piece during grinding. The G Ratio advantages of types 7 and 8 compared with type C4 was considerably reduced from the level shown in Table 4, but did not disappear entirely.

What is claimed is:

1. An abrasive article comprising abrasive particles dispersed in a bond material in which the abrasive particles comprise microcrystalline alumina and a superabrasive and the superabrasive provides from at least about 10% to about 55% of the volume of the article and from about 25% to about 90% of the volume of abrasive particles use in the article.

2. An abrasive article according to claim 1 in which the superabrasive particles provide from 20 to 45% of the volume of the wheel.

3. An abrasive article according to claim 1 in which the superabrasive provides from 40% to 80% of the volume of the abrasive particles.

4. An abrasive article according to claim 1 in which the microcrystalline alumina is a seeded sol gel alumina.

5. An abrasive article according to claim 1 in which the superabrasive is CBN.

6. An abrasive article comprising abrasive particles dispersed in a bond material in which the abrasive particles comprise from 20 to 60% of the volume of the article, and are provided by a mixture of CBN and seeded sol-gel alumina abrasive articles with the superabrasive providing from 50 to 90% of the volume of the particles.

7. An abrasive article according to claim 1 in the form of a wheel.

8. An abrasive article according to claim 6 in the form of a wheel.

9. An abrasive wheel having hub and rim portions in which the rim portion is a abrasive article according to claim 1.

10. An abrasive wheel having hub and rim portions in which the rim portion is an abrasive article according to claim 6.

11. An abrasive article according to claim 1 in which the bond is a vitreous material.

12. An abrasive article according to claim 1 in which the bond is a resinous material.

13. An abrasive article according to claim 6 in which the bond is vitreous material.

14. An abrasive article according to claim 6 in which the bond is a resinous material.

15. An abrasive wheel according to claim 9 in which the abrasive particles are held in a metallic bond.

16. An abrasive wheel according to claim 9 which a least some of the abrasive particles are metal coated before being incorporated in the bond material.

17. An abrasive wheel according to claim 10 which the abrasive particles are held in a metallic bond.

18. An abrasive wheel according to claim 10 in which at least some of the abrasive particles are metal coated before being incorporated in the bond material.

* * * * *